United States Patent [19]

Sievert

[11] Patent Number: 4,501,927

[45] Date of Patent: Feb. 26, 1985

[54] APPARATUS AND METHOD FOR SEALING SPLICES IN INSULATED ELECTRICAL CABLES

[75] Inventor: James A. Sievert, Stillwater, Minn.

[73] Assignee: Minnesota Mining and Manufacturing Company, St. Paul, Minn.

[21] Appl. No.: 528,059

[22] Filed: Aug. 31, 1983

[51] Int. Cl.³ .............................................. H02G 15/18
[52] U.S. Cl. ........................................ 174/93; 156/49; 174/84 R; 339/213 R
[58] Field of Search ................ 174/84 R, 93; 156/49; 339/213 R, 213 S; 285/DIG. 19; 277/209

[56] References Cited

U.S. PATENT DOCUMENTS

| | | | |
|---|---|---|---|
| 2,447,340 | 8/1948 | Jackson | 285/DIG. 19 X |
| 2,774,621 | 12/1956 | Kilbourne, Jr. | 277/209 |
| 2,906,552 | 9/1959 | White | 285/DIG. 19 X |
| 2,958,722 | 11/1960 | Rubin et al. | 174/84 R |
| 3,122,597 | 2/1964 | Lemieux | 264/229 |
| 3,268,654 | 8/1966 | Morrison et al. | 174/138 |
| 3,422,212 | 1/1969 | Clark | 174/84 R |
| 3,515,798 | 6/1970 | Sievert | 174/135 |
| 3,612,746 | 10/1971 | Sankey | 156/49 X |

FOREIGN PATENT DOCUMENTS

| | | | |
|---|---|---|---|
| 750729 | 11/1970 | Belgium | 174/84 R |
| 661265 | 8/1938 | Fed. Rep. of Germany | 277/209 |
| 1159536 | 4/1960 | Fed. Rep. of Germany | 174/93 |
| WO83/00779 | 3/1983 | PCT Int'l Appl. | 174/93 |

Primary Examiner—A. T. Grimley
Assistant Examiner—Morris H. Nimmo
Attorney, Agent, or Firm—Donald M. Sell; James A. Smith; David W. Anderson

[57] ABSTRACT

Apparatus for sealing and protecting the spliced junction of butt-spliced cables including a protective sleeve and two toroidal sealing rings and the method of assembling the sleeve and rings to the spliced cable which results in the sleeve being centered over the splice and the sealing rings spaced substantially midway between the splice and the ends of the protective sleeve.

8 Claims, 7 Drawing Figures

4,501,927

APPARATUS AND METHOD FOR SEALING SPLICES IN INSULATED ELECTRICAL CABLES

BACKGROUND OF THE INVENTION

1. Field of the Invention

The present invention relates to the apparatus and a method for insulating, sealing and protecting the joint of two insulated cables which are butt-spliced together.

2. Description of the Prior Art

Splices in electrically insulated cables, particularly those cables used in a distribution network, must be electrically insulated, protected from the elements and protected from physical damage which may be caused by digging, rocks and animals. The means utilized to protect the splice must be electrically nonconductive, must provide a seal to the cable insulation adjacent the splice to provide protection from the elements, should be resistant to abrasion and cutting and should be easily applied so that the splice protection may be applied in the field.

A number of methods have been described for accomplishing one or more of the desirable requirements of a protective device for a cable splice. U.S. Pat. No. 3,122,597, for example, describes a method of sealing splices in insulated electrical cables in which a mold is placed around the splice and filled with epoxy resin. Since the epoxy does not normally adhere well to the material used to insulate the cable, o-rings compatible with the epoxy are placed over the cable insulation prior to molding. These rings provide a seal from the elements and the epoxy coating provides resistance to damage. The primary drawback of such a system is that the protective epoxy coating cannot be easily applied in the field.

U.S. Pat. No. 3,268,654 discloses a rubber sleeve which spans the splice and is sealed to the cable insulation by means of band clamps. Although this structure is effective in sealing the splice from the elements and is easily applied, little protection from physical damage is afforded.

U.S. Pat. No. 3,515,798 describes a highly stretched rubber sleeve which is supported by a spirally-grooved core. After placing the core and sleeve assembly over the splice, the core may be unwound and removed to permit the sleeve to contract and seal the joint area. Such a structure is very easy to apply and highly effective in sealing the splice from the elements, but does not achieve the degree of physical protection which is considered desirable.

Finally, U.S. Pat. No. 2,958,722 describes a structure which utilizes o-rings encircling the insulation at either side of the splice which are covered by a rubber sleeve which spans the joint area. The structure of this patent effectively seals the splice from the elements, but affords little protection from physical damage. In addition, U.S. Pat. No. 2,958,722 suggests that the o-rings should be sufficiently tight fitting as to actually bite into the insulation of the cables and that the rubber sleeve "should have a diameter substantially equal to or slightly less than the diameter of the electric cables 1 and 2, so that it fits tightly about the insulated sections 5 and 6 of the wires and holds in contact by frictional engagement." It is apparent that these tight fitting o-rings and sleeve would be very difficult to apply in the field, and U.S. Pat. No. 2,958,722 suggests no method by which such application might be accomplished.

SUMMARY OF THE INVENTION

The present invention discloses a protective sleeve and sealing ring arrangement which electrically insulates the splice, provides protection from the elements and chemical attack and is extremely durable and resistant to physical damage. In addition, a method of applying the protective sleeve and rings is described by which the splice protection may be easily and rapidly applied in the field.

The apparatus contemplated by Applicant's invention includes a thick rigid or slightly flexible protective sleeve, either of which has an internal diameter significantly larger than the diameter of the insulation coating the electrical cables, and sealing rings located on either side of the splice which have an internal diameter smaller than that of the cable insulation and an external diameter greater than the internal diameter of the protective sleeve. After assembly of the protective sleeve to the cable, the sleeve is substantially centered over the splice and the sealing rings are located one on each end of the sleeve, disposed approximately midway between an end of the cable insulation and the adjacent end of the sleeve.

The method of applying the protective sleeve and sealing rings to the spliced cable includes positioning a sealing ring over each of the unspliced ends of the cables and threading one of the cables through the protective sleeve. After the cable splice is accomplished, one of the sealing rings is moved to a position on the cable insulation immediately adjacent the splice. This ring is then engaged by the sleeve and the sleeve moved toward this ring to roll the ring along the cable insulation between the sleeve and the insulation. The sleeve is moved to a position where its free end is positioned at the end of the insulation of the remaining cable adjacent the splice. The second sealing ring is then positioned adjacent the splice and the protective sleeve is moved over the second ring to a position which is substantially centered over the splice. During this movement the sealing rings are rolled by engagement with the sleeve and the cable insulation to the positions described above wherein the rings are located approximately midway between the cable insulation ends and the ends of the protective sleeve.

BRIEF DESCRIPTION OF THE DRAWINGS

The present invention will be more thoroughly described with reference to the accompanying drawings wherein like numbers refer to like parts in the several views, and wherein.

DESCRIPTION OF THE PREFERRED EMBODIMENTS

Figure 1:
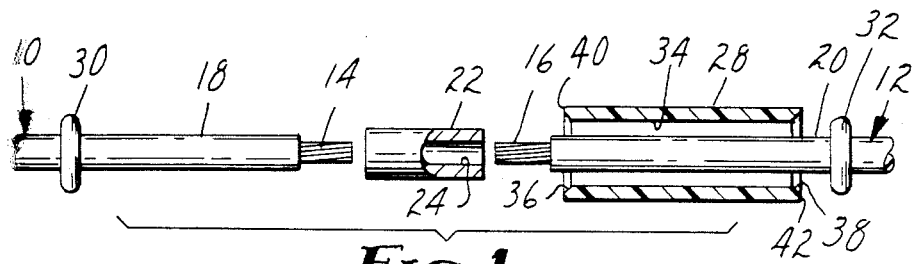
FIG. 1 illustrates two insulated cables and a connective splice, partially in section, prior to assembly and two sealing rings and a protective sleeve of Applicant's invention prior to assembly, the protective sleeve being shown in cross-section.

Referring now to FIG. 1, there are shown two insulated cables 10 and 12 which comprise, respectively, internal electrically conductive cores 14 and 16, which may be solid or stranded as shown, covered and electrically insulated by plastic or rubber insulation 18 and 20 which has a hard, circular outer surface. The cable 10, 12 with which the invention is employed is commonly referred to as distribution cable and ranges in outer diameter of the insulation 18, 20 from 8.6 mm to 67.9 mm. Cable of this type is commonly used in the underground wiring of residences and businesses and is stiff and relatively inflexible. In the laying of such cable, splices are necessarily employed to join lengths of cable and the particular splice employed is referred to as a "butt-splice". This type of splice results in cables which remain coaxial after joining and may be accomplished by many conventional and well-known methods. One method of accomplishing such a butt-splice is through the use of a crimp connector 22 which is a metallic cylinder which includes either a central throughhole or axial blind bores 24 as shown.

Figure 2:
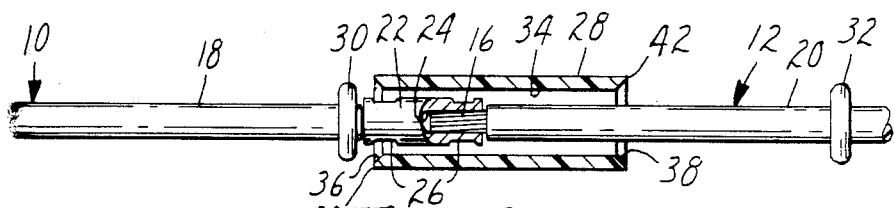
FIGS. 2 and 3 illustrate the splicing of the insulated cable and the steps of assembly of the sleeve and rings of FIG. 1 to the spliced cable.

Splicing of the cables 10, 12 is accomplished by stripping a length of insulation 18, 20 from the ends of the cables 10, 12 thus exposing the inner conductive core 14, 16 for connection. These exposed portions of the cores 14, 16 are inserted into opposite ends of the crimp connector 22 and a tool is used to produce a crimp 26 in the connector 22, as shown in FIG. 2, which forces the material of the connector 22 into electrical and physical contact with the ends of the conductive cores 14, 16.

Since the conductive cores 14, 16 of the cables 10, 12 are exposed, and because the connector 22 is metallic and electrically conductive, the accomplished splice must be electrically insulated and protected from the elements which may result in corrosion or chemical attack on the connection and failure of the joint. It is also desirable that the splice be protected from physical damage by a structure which is at least as resistant to damage from such things as rock, animals and digging tools as the insulation 18, 20 of the cables 10, 12. Since the splicing of the cables 10, 12 is accomplished in the field as the cable 10, 12 is laid, it is important that protection of the splice be easily accomplished with a minimum of additional equipment by a method which does not require a great deal of training.

Referring again to FIG. 1, protection of the splice is accomplished according to the present invention by providing a protective sleeve 28 and two sealing rings 30 and 32 which may be easily and rapidly assembled to the cables 10, 12 to provide a covering for the splice which protects the joined area from the elements and physical damage.

In one embodiment of the protective sleeve 28, the sleeve 28 is rigid and inflexible, and since the sleeve 28 must be electrically insulating, it is preferably manufactured from a material such as polyvinyl chloride, polyethylene or polycarbonate. The protective sleeve 28 is formed as a right circular cylinder having a central bore 34 which has a diameter greater than the crimp connector 22 and substantially greater than that of the cable insulation 18, 20. The outer diameter of the protective sleeve 28 is selected to provide a wall thickness which will provide adequate rigidity and strength. The sleeve 28 is provided at each end with a chamfer 36, 38 for a purpose to be described below.

The sealing rings 30, 32 are identical and toroidal in shape with a circular solid cross-section. The sealing rings 30, 32 are sized to have an internal diameter less than that of the cable insulation 18, 20 and an external diameter greater than that of the internal bore 34 of the protective sleeve 28. The sealing rings 30, 32 may be manufactured from natural or synthetic rubber and are preferably ethylene/propylene terpolymers (EPDM) because of this material's outstanding resistance to degradation by moisture, heat, light, oxygen and ozone.

Assembly of the protective sleeve 28 and the sealing rings 30, 32 to the spliced cables 10, 12 is accomplished as shown in FIGS. 1-4 and is initiated as illustrated in FIG. 1 by rolling one of the rings 30, 32 along each of the cables 10, 12 to a position removed from the exposed end of the conductive cores 14, 16 and inserting the end of one of the cables 12 through the bore 34 of the protective sleeve 28 so that the cable 12 extends beyond the end of the sleeve 28.

As shown in FIG. 2, the cables 10, 12 are then spliced together, as by means of the crimp connector 22, and one of the sealing rings 30 is rolled along its cable 10 to the end of the insulation 18 adjacent the splice. It should be apparent that although the sealing ring 30 located opposite the sleeve 28 is shown moved to the splice first, this is not required. The sealing ring 32 could be moved to the splice first by sliding the protective sleeve to the opposite side of the splice from the position at which it is initially located.

Figure 3:
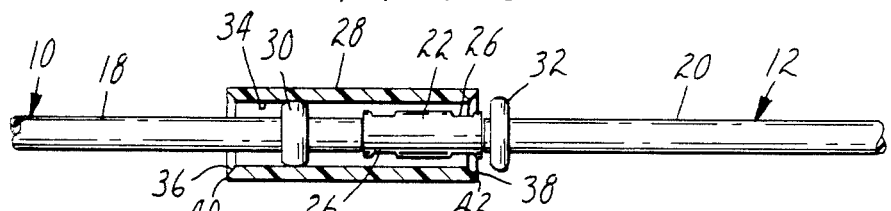

As shown in FIG. 3, after positioning the sealing ring 30 adjacent the splice, an end 40 of the protective sleeve 28 is moved to the left to engage and compress the ring 30 and toward the sealing ring 30 until its opposite end 42 is positioned at the junction of the splice and the insulation 20 of the remaining cable 12. As may be seen in FIG. 3, movement of the sleeve 28 after its contact with the sealing ring 30 causes the ring 30 to roll along the cable 10 approximately one-half the distance that the end 40 of the sleeve 28 moves from the junction of the splice and the cable insulation 18. After the end 42 of the protective sleeve 28 is positioned at the junction of the splice and the cable insulation 20, the remaining sealing ring 32 is rolled along the cable 12 to the left to the junction of the splice and the cable insulation 20.

Figure 4:
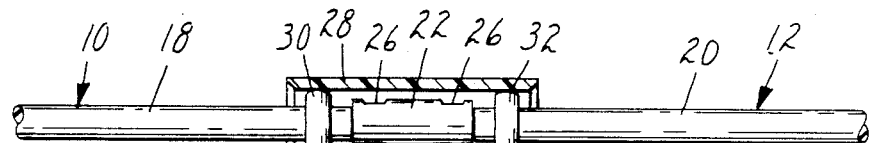
FIG. 4 illustrates the completed cable splice and the completed assembly of the sleeve and rings of FIG. 1 to the spliced cable.

As shown in FIG. 4, the protective sleeve 28 is then moved to the right over the splice to engage and compress the sealing ring 32 and center the sleeve 28 with respect to the splice. This movement of the sleeve 28 causes the sealing ring 30 to roll along the cable insulation 18 toward the splice approximately one-half the distance the sleeve 28 travels and also causes the opposite sealing ring 32 to move away from the end of the insulation 20 approximately one-half of the distance moved by the sleeve 28.

The ends 40, 42 of the sleeve 28 are provided with the chamfers 36 and 38 to assist in the compression of the rings 30, 32 and to prevent cutting of the rings 30, 32 by sharp edges of the sleeve 28. It will be apparent that the rings 30, 32 must roll relative to the cables 10, 12 to be correctly positioned. In the smaller sizes of the cables 10, 12 it has been found that slippage of the rings 30, 32 relative to the cables 10, 12 sometimes occurs. This slippage may be prevented by coating the rings 30, 32 with an adhesive, preferably a microspherical adhesive which will not transfer to the sleeve 28 or the cables 10, 12, to increase friction and ensure relative rolling motion.

There results an assembled protective covering for the splice in which the protective shell 28 is centered over the splice and each of the sealing rings 30, 32 is positioned approximately one-half the distance between the connector 22 and the ends 40, 42 of the protective sleeve 28. Since the protective shell 28 is rigid and inflexible, the splice is protected from physical damage which may be caused by animals, rocks or digging implements. The sealing rings 30, 32 are compressed between the protective sleeve 28 and the insulation 18, 20 of the cables 10, 12 and thus provide protection from water or chemicals which might corrode or otherwise damage the connector 22 or the exposed ends of the conductive cores 14, 16 of the cables 10, 12.

The sealing rings 30, 32 are sized to accomplish this sealing function and also provide ease of assembly. The internal diameters of the sealing rings 30, 32 are sized so that this diameter of the sealing rings 30, 32, in the relaxed state, is less than that of the diameter of the cable insulation 18, 20. The outer diameter of the sealing rings 30, 32 is selected to be greater than the internal diameter of the protective sleeve 28 so that the sealing rings 30, 32 will be compressed during assembly and achieve a liquid-tight seal, but not so much greater than the internal diameter of the sleeve 28 that compression of the rings 30, 32 would be difficult for those assembling the protective sleeve 28 to the spliced cable.

Retention of the protective sleeve 28 centered with respect to the connector 22 may be accomplished by wrapping electrical tape around either or both of the ends 40, 42 of the protective sleeve 28 to the cables 10, 12, but the addition of such tape has not been found to be necessary. It has been found that the sealing rings 30, 32 take a slight "set" in their compressed oval shape after assembly and thus acquire a resistance to rolling which maintains the sleeve 28 in position. This set is not so great, however, that the sleeve 28 is difficult to disassemble or reuse of the sealing rings 30, 32 after disassembly is precluded.

Figure 5:
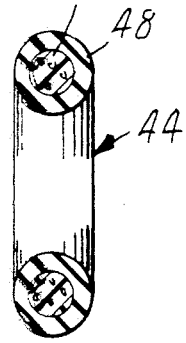
FIG. 5 illustrates in cross-section an alternate embodiment of the sealing rings of FIGS. 1-4.

FIG. 5 illustrates a sealing ring 44 which may be used in place of the sealing rings 30, 32 of FIGS. 1-4. The sealing ring 44 of FIG. 5 includes an inner toroidal core 46 of a material which may be more easily compressed than the outer toroidal shell 48 which is solid synthetic or natural rubber as used for the sealing rings 30 and 32. The inner core 46 may be composed of open or closed cell sponge rubber, and may be EPDM rubber as is preferably used for the outer shell 48 and the sealing rings 30, 32. The sealing ring 44 of FIG. 5 is provided with its inner core 46 so that the sealing ring 44 may be more easily compressed than would be the case if the ring 44 were solid. This feature has been found to be useful when it is desired to splice cable of relatively large size. The inner core 46 also may allow the outer diameter of the sealing ring 44 to be larger in relation to the diameter of the bore 34 without significantly increasing the amount of effort necessary to compress the sealing ring 44 between the protective sleeve 28 and the cables 10, 12.

Figure 6:
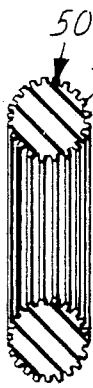
FIG. 6 illustrates in cross-section a second alternate embodiment of the sealing rings of FIGS. 1-4.

FIG. 6 illustrates a third embodiment of a sealing ring 50 which is provided with a series of radial projections 52 around the circumference of the cross-section of the sealing ring 50. The projections 52 are useful in increasing the number of contact points between the sealing ring 50 the protective shell 28 and the cables 10, 12 in order to create a labyrinth seal and increase the performance of the ring 50 in excluding contaminants from the splice. It should be apparent that the sealing ring 50 of FIG. 6 could be provided with the internal sponge rubber core 46 of the sealing ring 44 of FIG. 5.

Figure 7:
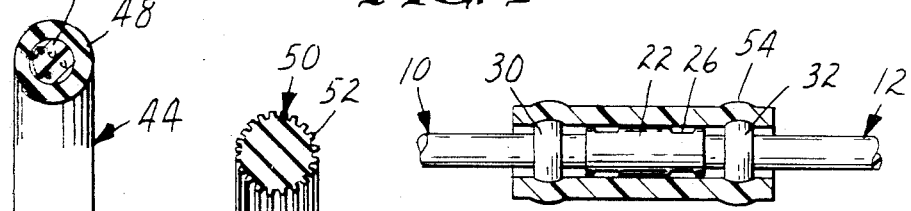
FIG. 7 illustrates in cross-section an alternate embodiment of the protective sleeve of the invention and the cable splice to which this sleeve is assembled.

FIG. 7 illustrates a further embodiment of a protective shell 54 which is not as rigid and inflexible as the protective sleeve 28 of FIGS. 1-4, but rather is produced of natural or synthetic rubber, preferably EPDM rubber. The flexible protective sleeve 54 of FIG. 7 is provided to reduce the amount of force necessary to assemble the protective sleeve 54 to the sealing rings 30, 32 when it is desired to splice cable in the larger sizes. Since the sealing rings 30, 32 must increase in size as the diameter of the cable 10, 12 increases, it becomes increasingly difficult to compress the sealing rings 30, 32. To reduce the amount of effort necessary, the protective sleeve 54 is provided to stretch outwardly at the point of contact between the sealing rings 30, 32 and the protective sleeve 54. Since the sleeve 54 stretches in addition to compressing the sealing rings 30, 32, the amount of effort necessary to position the protective sleeve 54 with respect to the splice is reduced. Even though the sleeve 54 is somewhat flexible, its wall is thick enough to resist damage and its inner diameter is substantially larger than the diameter of the insulation 18, 20 so that the sleeve 54 may be assembled to the spliced cable by the method described above.

Although the invention has been described with respect to certain specific embodiments, it is recognized that modifications will be apparent to those skilled in the art. For example, it will be apparent that more than one ring 30, 32 could be provided at each end of the sleeve 28 and moved as a set as the sleeve 28 is positioned. The invention is intended to cover all such modifications which fall within the scope of the appended claims.

I claim:

1. In combination with a pair of insulated cables butt-spliced together, a protective and sealing assembly comprising:
   a protective cylindrical sleeve having an internal diameter greater than that of said insulated cables so that said sleeve may freely slide along said cables and having a length substantially longer than said butt-splice so that said sleeve spans said splice and extends beyond said splice along each of said insulated cables; and
   at least one toroidal sealing ring disposed at each end of said sleeve, between said sleeve and said cables, and substantially midway between the ends of said sleeve and said butt-splice, said rings when undeformed having an internal diameter less than the diameter of said insulated cables and an external diameter greater than the internal diameter of said sleeve so that said rings seal to the insulation of said cables and to said sleeve and are compressed between said sleeve and said insulated cables.

2. A protective and sealing assembly according to claim 1 wherein said sleeve is inflexible and substantially undeformed by the force of said sealing rings compressed between said sleeve and said cables.

3. A protective and sealing assembly according to claim 1 wherein said sleeve is deformable outwardly by the force of said sealing rings compressed between said sleeve and said cables.

4. A protective and sealing assembly according to claim 1 wherein said rings are EPDM rubber.

5. A protective and sealing assembly according to claim 1 wherein said rings include a soft interior core to facilitate their deformation under compression.

6. A protective and sealing assembly according to claim 5 wherein said rings include radial projections to increase the number of contact points between said rings and said sleeve and said rings and said insulated cables to create labyrinth seals.

7. A protective and sealing assembly according to claim 1 wherein said rings include radial projections to increase the number of contact points between said rings and said sleeve and said rings and said insulated cables to create labyrinth seals.

8. A method of protecting and sealing the splice of two insulated cables having ends to be butt-spliced together comprising the steps of:

rolling at least one toroidally shaped sealing ring having an internal diameter less than that of said insulated cables along each of said cables to points removed from the ends of said cables;

inserting an end of one of said cables through a protective sleeve having an internal diameter less than the external diameter of said sealing rings but greater than that of said insulated cables so that said protective sleeve is free to slide along said cable, said cable being inserted until said protective sleeve is spaced from said end of said cable and disposed between said end of said cable and one of said sealing rings;

splicing said cables;

rolling one of said sealing rings along its respective cable to a position adjacent said splice;

engaging said one sealing ring with one end of said protective sleeve and moving said sleeve in the direction from said splice toward said one ring until the other end of said sleeve is adjacent the end of said splice opposite said one ring whereby said one ring is rolled along the cable with the movement of said sleeve away from said splice to a position intermediate said one end of said sleeve and said splice;

rolling the other of said sealing rings to a position adjacent said splice and said other end of said sleeve; and engaging said other sealing ring with said other end of said sleeve and moving said sleeve in the direction from said splice toward said other ring until said sleeve is substantially centered over said splice, thereby compressing said other ring between the inner surface of said sleeve and said cable and causing said other ring to roll away from said splice while said movement of said sleeve from said splice toward said other ring causes said one ring to roll toward said splice resulting in both rings being substantially equally spaced from said ends of said sleeve and substantially equally spaced from said splice.

* * * * *